(12) United States Patent
Amini et al.

(10) Patent No.: US 11,064,208 B2
(45) Date of Patent: Jul. 13, 2021

(54) TRANSCODING IN SECURITY CAMERA APPLICATIONS

(71) Applicant: Arlo Technologies, Inc., Carlsbad, CA (US)

(72) Inventors: Peiman Amini, Mountain View, CA (US); Joseph Amalan Arul Emmanuel, Cupertino, CA (US)

(73) Assignee: ARLO TECHNOLOGIES, INC., Carlsbad, CA (US)

( * ) Notice: Subject to any disclaimer, the term of this patent is extended or adjusted under 35 U.S.C. 154(b) by 0 days.

(21) Appl. No.: 15/994,270

(22) Filed: May 31, 2018

(65) Prior Publication Data

US 2019/0260814 A1 Aug. 22, 2019

Related U.S. Application Data

(60) Provisional application No. 62/633,017, filed on Feb. 20, 2018.

(51) Int. Cl.
*H04L 12/26* (2006.01)
*H04L 29/06* (2006.01)
(Continued)

(52) U.S. Cl.
CPC .......... *H04N 19/166* (2014.11); *G06F 9/542* (2013.01); *G06K 9/00771* (2013.01); *G06T 7/20* (2013.01);
(Continued)

(58) Field of Classification Search
CPC ... H04L 1/0009; H04L 1/0017; H04L 1/0033; H04L 43/0858; H04L 43/12; H04L 43/16; H04L 65/4084; H04L 65/608; H04L 65/80; H04L 65/1093; H04N 19/166; H04N 19/103; H04N 19/124; H04N 19/156; H04N 19/184; H04N 19/40; H04N 19/42; G08B 3/10; G08B 3/1016; G08B 13/223;
(Continued)

(56) References Cited

U.S. PATENT DOCUMENTS 7,539,489 B1 5/2009 Alexander
8,855,035 B2 10/2014 Lemoine et al.
(Continued)

FOREIGN PATENT DOCUMENTS

JP 2010232819 A 10/2010
WO 2006075052 A1 7/2006
WO 2009048660 A2 4/2009

*Primary Examiner* — Tauqir Hussain
(74) *Attorney, Agent, or Firm* — Perkins Coie LLP

(57) ABSTRACT

The disclosure is related to adaptive transcoding of video streams from a camera. A camera system includes a camera and a base station connected to each other in a first communication network, which can be a wireless network. When a user requests to view a video from the camera, the base station obtains a video stream from the camera, transcodes the video stream, based on one or more input parameters, to generate a transcoded video stream, and transmits the transcoded video stream to a user device. The base station can transcode the video stream locally, e.g., within the base station, or in a cloud network based on transcoding location factors. Further, the camera system can also determine whether to stream the video to the user directly from the base station or from the cloud network based on streaming location factors.

33 Claims, 8 Drawing Sheets

(51) Int. Cl.

| | | |
|---|---|---|
| H04L 29/08 | (2006.01) | |
| H04N 19/166 | (2014.01) | |
| H04N 19/156 | (2014.01) | |
| H04N 7/18 | (2006.01) | |
| H04N 19/184 | (2014.01) | |
| H04N 19/124 | (2014.01) | |
| H04N 5/232 | (2006.01) | |
| H04N 19/40 | (2014.01) | |
| H04W 28/02 | (2009.01) | |
| G08B 13/191 | (2006.01) | |
| G08B 13/193 | (2006.01) | |
| G08B 29/18 | (2006.01) | |
| H04L 5/00 | (2006.01) | |
| H04N 7/12 | (2006.01) | |
| H04W 36/00 | (2009.01) | |
| H04W 36/30 | (2009.01) | |
| H04W 72/04 | (2009.01) | |
| H04N 19/103 | (2014.01) | |
| H04N 19/42 | (2014.01) | |
| G06K 9/00 | (2006.01) | |
| H04N 5/247 | (2006.01) | |
| G06T 7/20 | (2017.01) | |
| G08B 3/10 | (2006.01) | |
| G08B 13/196 | (2006.01) | |
| G06F 9/54 | (2006.01) | |
| G08B 5/22 | (2006.01) | |
| G08B 21/18 | (2006.01) | |
| G08B 27/00 | (2006.01) | |
| H04B 17/391 | (2015.01) | |
| H04N 17/00 | (2006.01) | |
| H04B 17/318 | (2015.01) | |
| H04W 24/08 | (2009.01) | |
| H04W 24/10 | (2009.01) | |
| H04W 52/02 | (2009.01) | |
| H04L 1/00 | (2006.01) | |
| G07C 9/37 | (2020.01) | |
| H05B 47/19 | (2020.01) | |
| H05B 47/105 | (2020.01) | |
| H04N 7/14 | (2006.01) | |
| H04N 19/00 | (2014.01) | |

(52) U.S. Cl.
CPC ............... *G07C 9/37* (2020.01); *G08B 3/10* (2013.01); *G08B 3/1016* (2013.01); *G08B 5/223* (2013.01); *G08B 13/191* (2013.01); *G08B 13/193* (2013.01); *G08B 13/1966* (2013.01); *G08B 13/19656* (2013.01); *G08B 13/19669* (2013.01); *G08B 13/19695* (2013.01); *G08B 21/182* (2013.01); *G08B 27/006* (2013.01); *G08B 29/183* (2013.01); *H04B 17/318* (2015.01); *H04B 17/391* (2015.01); *H04L 1/0003* (2013.01); *H04L 1/0009* (2013.01); *H04L 1/0017* (2013.01); *H04L 1/0033* (2013.01); *H04L 5/0053* (2013.01); *H04L 43/0858* (2013.01); *H04L 43/12* (2013.01); *H04L 43/16* (2013.01); *H04L 65/4084* (2013.01); *H04L 65/608* (2013.01); *H04L 65/80* (2013.01); *H04L 67/1093* (2013.01); *H04N 5/23206* (2013.01); *H04N 5/23227* (2018.08); *H04N 5/23254* (2013.01); *H04N 5/247* (2013.01); *H04N 7/12* (2013.01); *H04N 7/183* (2013.01); *H04N 17/002* (2013.01); *H04N 19/103* (2014.11); *H04N 19/124* (2014.11); *H04N 19/156* (2014.11); *H04N 19/184* (2014.11); *H04N 19/40* (2014.11); *H04N 19/42* (2014.11); *H04W 24/08* (2013.01); *H04W 24/10* (2013.01); *H04W 28/021* (2013.01); *H04W 36/0011* (2013.01); *H04W 36/30* (2013.01); *H04W 52/0245* (2013.01); *H04W 52/0261* (2013.01); *H04W 72/042* (2013.01); *H04W 72/0453* (2013.01); *H05B 47/105* (2020.01); *H05B 47/19* (2020.01); *G06T 2207/30232* (2013.01); *G06T 2207/30241* (2013.01); *H04N 7/147* (2013.01); *H04N 7/181* (2013.01); *H04N 19/00* (2013.01)

(58) Field of Classification Search
CPC ............... G08B 13/191; G08B 13/193; G08B 13/19656; G08B 13/1966; G08B 13/19669; G08B 13/19695; H04W 24/08; H04W 24/10; H04W 36/0011; H04W 36/30
USPC ........................................................ 709/219
See application file for complete search history.

(56) References Cited

U.S. PATENT DOCUMENTS

| | | | |
|---|---|---|---|
| 9,179,495 B1 | 11/2015 | Scherzer et al. | |
| 9,451,484 B2 | 9/2016 | Boulton | |
| 9,712,814 B2 | 7/2017 | Tanaka et al. | |
| 9,996,750 B2* | 6/2018 | Campbell | H04N 21/4223 |
| 10,033,436 B2 | 7/2018 | Thubert et al. | |
| 10,044,104 B1 | 8/2018 | Bartko et al. | |
| 10,177,965 B1* | 1/2019 | Joshi | H04L 41/0668 |
| 10,425,638 B2 | 9/2019 | Yu et al. | |
| 2002/0059627 A1 | 5/2002 | Islam et al. | |
| 2002/0105921 A1 | 8/2002 | Sawyer et al. | |
| 2002/0181637 A1 | 12/2002 | Nakabayashi | |
| 2003/0055908 A1 | 3/2003 | Brown et al. | |
| 2003/0063277 A1 | 4/2003 | Kennedy et al. | |
| 2003/0193525 A1 | 10/2003 | Nygaard | |
| 2005/0086569 A1 | 4/2005 | Hiddink et al. | |
| 2005/0169209 A1 | 8/2005 | Miu et al. | |
| 2007/0153916 A1 | 7/2007 | Demircin et al. | |
| 2008/0020746 A1 | 1/2008 | Alexandar et al. | |
| 2008/0025378 A1 | 1/2008 | Mahany et al. | |
| 2008/0026748 A1 | 1/2008 | Alexander et al. | |
| 2008/0112315 A1* | 5/2008 | Hu | H04N 7/17318 |
| | | | 370/230 |
| 2009/0022222 A1* | 1/2009 | He | H04N 19/597 |
| | | | 375/240.12 |
| 2009/0273679 A1 | 11/2009 | Gere et al. | |
| 2010/0080205 A1 | 4/2010 | Hirsch et al. | |
| 2010/0097472 A1 | 4/2010 | Chathukutty et al. | |
| 2010/0285753 A1 | 11/2010 | Foegelle | |
| 2012/0314875 A1* | 12/2012 | Lee | G10L 19/008 |
| | | | 381/22 |
| 2013/0021912 A1 | 1/2013 | Finlow-bates et al. | |
| 2013/0053653 A1 | 2/2013 | Cuddihy et al. | |
| 2014/0036993 A1* | 2/2014 | Bae | H04N 19/156 |
| | | | 375/240.02 |
| 2014/0051379 A1 | 2/2014 | Ganesh et al. | |
| 2014/0064120 A1 | 3/2014 | Sethuraman et al. | |
| 2014/0092755 A1 | 4/2014 | Van De Ven et al. | |
| 2014/0115114 A1* | 4/2014 | Garmark | H04L 65/60 |
| | | | 709/219 |
| 2014/0169195 A1 | 6/2014 | Hsin et al. | |
| 2014/0169509 A1 | 6/2014 | Tsofe | |
| 2014/0240491 A1 | 8/2014 | Kauniskangas et al. | |
| 2014/0269655 A1 | 9/2014 | Du et al. | |
| 2014/0307707 A1 | 10/2014 | Mestanov et al. | |
| 2014/0368601 A1* | 12/2014 | deCharms | H04L 67/26 |
| | | | 348/14.02 |
| 2015/0185857 A1 | 7/2015 | Jung | |
| 2015/0229426 A1 | 8/2015 | Yu et al. | |
| 2015/0319411 A1 | 11/2015 | Kasmir et al. | |
| 2015/0349859 A1 | 12/2015 | Emmanuel et al. | |

(56) References Cited

U.S. PATENT DOCUMENTS

| | | |
|---|---|---|
| 2015/0381310 A1 | 12/2015 | Harnmarwall et al. |
| 2016/0105644 A1* | 4/2016 | Smith .................. G08B 29/185 |
| | | 348/159 |
| 2016/0114887 A1* | 4/2016 | Zhou ........................ B60F 5/02 |
| | | 348/148 |
| 2016/0125714 A1 | 5/2016 | Kates et al. |
| 2016/0165620 A1 | 6/2016 | Dagen et al. |
| 2016/0278104 A1 | 9/2016 | Hireniath et al. |
| 2016/0337243 A1* | 11/2016 | Cui ....................... H04L 47/122 |
| 2016/0366702 A1 | 12/2016 | Baba et al. |
| 2017/0055179 A1 | 2/2017 | Radunovic et al. |
| 2017/0070732 A1 | 3/2017 | Roulet et al. |
| 2017/0078242 A1 | 3/2017 | Nakamura et al. |
| 2017/0180442 A1* | 6/2017 | Lawrence ............. H04L 65/601 |
| 2017/0237673 A1 | 8/2017 | Law |
| 2017/0242129 A1 | 8/2017 | Kallankari et al. |
| 2017/0244712 A1 | 8/2017 | Meredith et al. |
| 2017/0301201 A1* | 10/2017 | Siann ..................... H04N 7/185 |
| 2017/0301203 A1 | 10/2017 | Matsuura |
| 2018/0306904 A1 | 10/2018 | Vacanti |
| 2018/0375594 A1 | 12/2018 | Kildal et al. |
| 2019/0014388 A1* | 1/2019 | Rutledge ............ H04N 21/6181 |
| 2019/0132371 A1* | 5/2019 | Bhat ................... H04L 65/4069 |
| 2019/0162769 A1 | 5/2019 | Zhao et al. |
| 2019/0200013 A1* | 6/2019 | Wu ...................... H04N 19/115 |
| 2019/0202657 A1 | 7/2019 | Li et al. |
| 2019/0222897 A1* | 7/2019 | Frusina ............. H04N 21/2187 |
| 2019/0261370 A1 | 8/2019 | Amini et al. |
| 2019/0282897 A1* | 9/2019 | Posin ...................... A63F 13/34 |
| 2019/0364505 A1 | 11/2019 | Wang et al. |

* cited by examiner

TRANSCODING IN SECURITY CAMERA APPLICATIONS

CROSS-REFERENCE TO RELATED APPLICATION(S)

This application claims the benefit of U.S. Provisional Patent Application No. 62/633,017, entitled "OPTIMIZATION AND TESTING OF WIRELESS DEVICES" filed on Feb. 20, 2018, which is incorporated by reference herein in its entirety.

TECHNICAL FIELD

The disclosure is related to transcoding a video stream captured from a security camera.

BACKGROUND

Transcoding is a process of decoding an encoded content and then altering the decoded content based on one or more requirement and encoding the altered content. As an example, using transcoding the audio and/or video format (codec) may be changed from one to another, such as converting from an MPEG2 source (commonly used in broadcast television) to H.264 video and AAC audio codes, which may be used for streaming. Other basic tasks could include adding watermarks, logos, or other graphics to your video. A video streaming service, such as a movie streaming service, uses transcoding to typically stream videos to different types of user devices, such as smartphones, laptops, smart televisions (TVs). For example, if the content to be streamed is of a resolution 4K (ultra-high-definition), not all user devices may be capable streaming the content smoothly. The viewers without sufficient network bandwidth may not be able to view the stream as their players may be buffering the content constantly as they wait for packets of that 4K video to arrive or devices with lower resolution may not be able to the view the content at all. Accordingly, the video streaming service may transcode the content to generate multiple video streams of various bit rates or resolution, e.g., 1080p, 720p, and send the appropriate stream to the user devices.

However, the current transcoding techniques do not adapt to the change in environment, e.g., representative of various user device or network parameters, in which the streaming is performed. For example, consider a user would like to view a live video stream from a security camera installed at a home of the user on a user device such as a smartphone. When a data rate associated with a network to which the smartphone is connected decreases, the current techniques do not get a feedback of the change in data rate and therefore, continues with the streaming at a same bit rate or resolution of the video, which results in loss of video frames or video being jittery or stuck. That is, the current transcoding techniques are not optimized based on the dynamic nature of the environment. Further, the current transcoding techniques typically perform transcoding in a cloud server, which is typically in a network different from that of a source of the content, and that adds to the latency in streaming the content. The current transcoding techniques do not have the capability to perform the transcoding closer to the source of the content, e.g., in the same network, or at a device associated with a device that generates the content, and therefore, are inefficient.

SUMMARY

The disclosure is related to adaptive transcoding of video streams from a camera. A camera system includes a camera and a base station connected to each other in a first network, which can be a wireless local area network (WLAN). When a user requests for a video from the camera, the base station obtains a video stream from the camera, transcodes the video stream within the base station to generate a transcoded video stream, and transmits the transcoded video stream to a user device. The user device can be any computing device associated with the user, such as a smartphone, a laptop, a tablet personal computer (PC), or a smart TV.

The base station performs the transcoding based on one or more input parameters of an environment in which the video streaming is performed, such as network parameters associated with the first network, network parameters associated with a second network to which the user device is connected, parameters associated with the user device. The base station can also adapt the transcoding to a change in one or more of the input parameters. For example, if a speed, e.g., a data rate, of the second network decreases from a first bit rate to a second bit rate, the base station can automatically learn of the decrease in the speed of the second network, and transcode the video stream by decreasing a resolution and/or bit rate of the video stream to generate an adjusted transcoded video stream. Similarly, the transcoding can increase the resolution and/or the bit rate back up when the speed of the second network improves. While speed of the second network is one of the input parameters to which the transcoding can dynamically adapt, the transcoding can be adapt to various other input parameters, such as the ones mentioned above.

Further, the base station can also dynamically determine whether to stream the transcoded video stream directly to the user device, e.g., using a peer-to-peer (P2P) streaming technique, or via a video streaming server located in a cloud network based on streaming location factors. For example, if the base station determines that the user device is in the same network, e.g., LAN, as the base station or if a latency or a load associated with the video streaming server is above a specified threshold, the base station can stream the transcoded video stream to the user device using the P2P streaming technique. In another example, if the base station determines that the user device is in a network that does not support P2P streaming, or if the user device is experiencing data loss in receiving the video stream directly, the base station can transmit the transcoded video stream to the video streaming server for streaming to the user device.

Furthermore, the base station can also determine whether to perform the transcoding locally, e.g., at the base station, or using a server in a cloud network, based on transcoding location factors. For example, if the availability of resources at the base station, e.g., processing capacity, memory, for performing the transcoding is unavailable or below a specified threshold, or if the transcoding to a particular requirement, e.g., codec, is unavailable, the base station can determine to have the video stream transcoded at the server in the cloud network. In another example, if the base station determines that a latency or a load associated with the server is above a specified threshold, or if there is a licensing cost associated with transcoding at the server or if the licensing cost is above a specified threshold, the base station can determine to transcode the video stream at the base station.

The base station can continuously monitor the input parameters, the streaming location factors, and the transcoding location factors, e.g., by obtaining feedback from the user device or an access point of the network to which the user device is connected, and dynamically adapt the transcoding based on the input parameters.

DETAILED DESCRIPTION

Figure 1A:
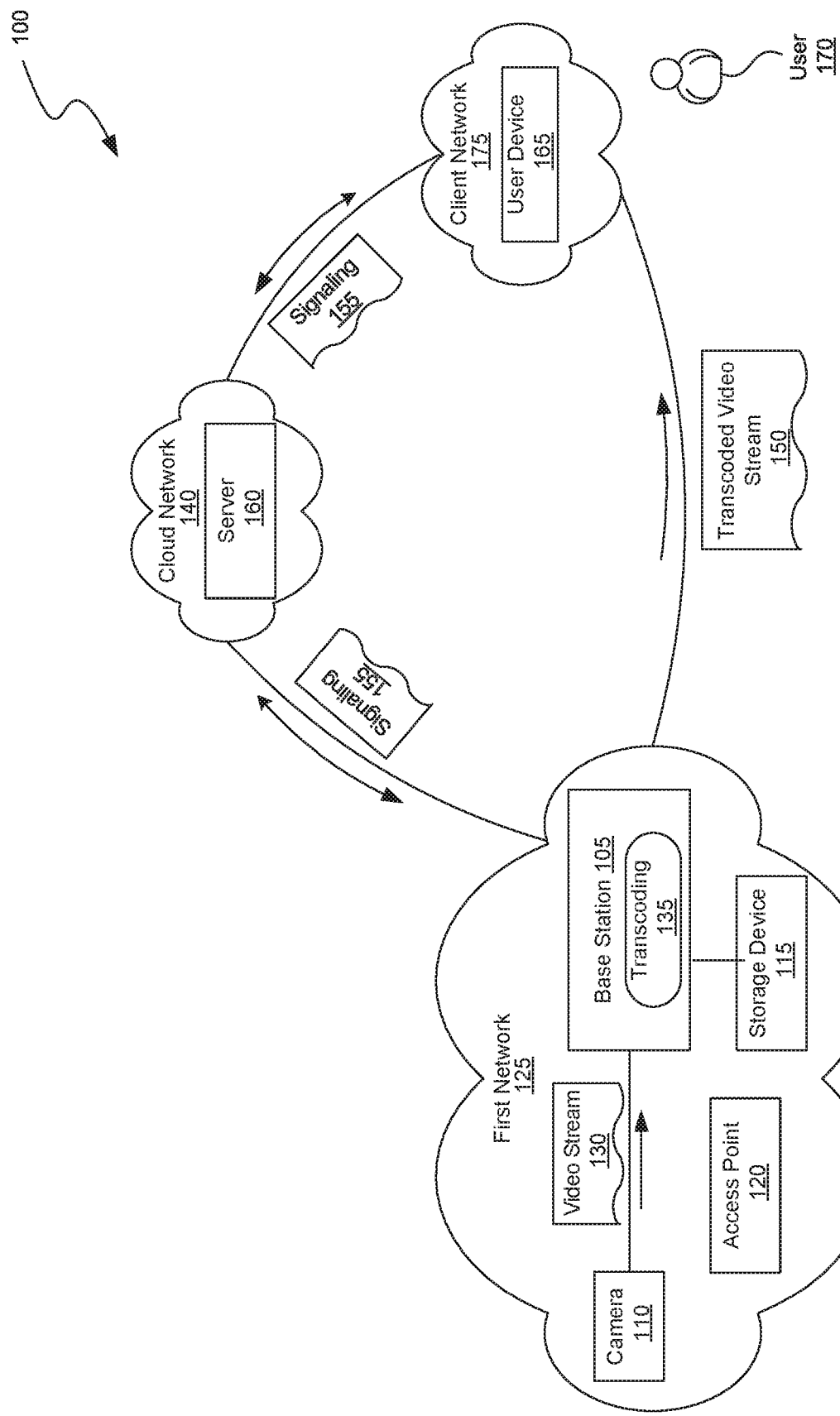
FIG. 1A is a block diagram illustrating an environment in which transcoding of a video stream in a camera system having a base station can be implemented.

FIG. 1A is a block diagram illustrating an environment in which transcoding of a video stream in a camera system having a base station can be implemented. The environment 100 includes a camera system having a base station 105 and a camera 110. In some embodiments, the camera system is a security camera system that can be installed in a building, e.g., a house. The base station 105 and the camera 110 can be connected to each other using a first network 125. The first network 125 can be a local area network (LAN). In some embodiments, the first network 125 is a wireless LAN (WLAN), such as a home Wi-Fi, created by an access point 120. The camera 110 and the base station 105 can be connected to each other wirelessly, e.g., over Wi-Fi, or using wired means. The base station 105 and the camera 110 can be connected to each other wirelessly via the access point 120, or directly with each other without the access point 120, e.g., using Wi-Fi direct, Wi-Fi ad hoc or similar wireless connection technologies. Further, the base station 105 can be connected to the first network 125 using a wired means or wirelessly.

The camera 110 captures video and transmits the video to the base station 105 as a video stream 130. The camera 110 can encode the video stream 130 using any codec, e.g., H.264. Further, a file format of the video stream 130 can be one of many formats, e.g., AVI, MP4, MOV, WMA, or MKV. The video stream 130 can include audio as well if the camera 110 has audio capabilities, e.g., a speaker and/or a microphone. The camera 110 can be battery powered or powered from a wall outlet. The camera 110 can include one or more sensors, e.g., a motion sensor that can activate the recording of the video when a motion is detected. The camera 110 can include infrared (IR) light emitting diode (LED) sensors, which can provide night-vision capabilities. Although the environment 100 illustrates a single camera 110, the camera system can include multiple cameras (which can be installed at various locations of a building). Further, all the cameras in the camera system can have same features, or at least some of the cameras can have different features. For example, one camera can have a night-vision feature while another may not. One camera can be battery powered while another may be powered from the wall outlet.

The base station 105 can be a computer system that securely connects the camera 110 to the Internet via the access point 120. The base station 105 can provide various features such as long range wireless connectivity to the camera 110, a local storage device 115, a siren, connectivity to network attached storage (NAS), and enhance battery life of the camera 110, e.g., by making the camera 110 work efficiently and keeping the communications between the base station 105 and the camera 110 efficient. The base station 105 can be configured to store the video captured from the camera 110 in any of the local storage device 115, the NAS, or a cloud storage service. The base station 105 can be configured to generate a sound alarm from the siren when an intrusion is detected by the base station 105 based on the video stream 130 receive from the camera 110.

Another feature of the base station 105 is that it can create its own network within the first network 125, so that the camera 110 may not overload or consume the network bandwidth of the first network 125. The camera 110 typically connects to the base station 105 wirelessly. The first network 125 can include multiple base stations to increase wireless coverage of the base station 105, which may be beneficial or required in cases where the cameras are spread over a large area.

When a user 170 sends a request, e.g., from a user device 165, to view a live video feed from the camera 110, the base station 105 receives the request and in response to receiving the request, obtains the video stream 130 from the camera 110, transcodes 135 the video stream 130 to generate a transcoded video stream 150, and streams the transcoded video stream 150 to the user device 165. Upon receiving the transcoded video stream 150 at the user device 165, a video player application in the user device 165 decodes the transcoded video stream 150 and plays the video on a display on the user device 165 for the user 170 to view. The user device 165 can be any computing device that can connect to a network and play video content, such as a smartphone, a laptop, a desktop, a tablet personal computer (PC), or a smart TV.

Although the video stream 130 is described as a live or real-time video stream from the camera 110, the video stream 130 is not limited to real-time video stream, it can be a video stream retrieved from the storage device 115, the NAS or the cloud storage service.

The base station 105 can stream the transcoded video stream 150 to the user device 165 in multiple ways. For example, the base station 105 can stream the transcoded video stream to the user device 165 using P2P streaming technique. In P2P streaming, when the video player on the user device 165 requests the video stream 130, the base station 105 and the user device 165 continuously exchange signaling information 155 via a server 160 in a cloud network 140 to determine the location information of the base station 105 and the user device 165 for each other, to find a best path and establish a connection to route the transcoded video stream 150 from the base station 105 to the user device 165. After establishing the connection, the base station 105 streams the transcoded video stream 150 to the user device 165, eliminating the additional bandwidth cost to deliver the transcoded video stream 150 from the base station 105 to a video streaming server in the cloud network 140 and for streaming from the video streaming server to the user device 165. The server 160 keeps a log of available peer node servers to route the video stream and establishes the connection between the user device 165 and the peers. The server 160 is a signaling server or can include signaling software whose function is to maintain and manage a list of peers and handle the signaling 155 between the base station 105 and the user device 165. In some embodiments, the server 160 can dynamically select the best peers based on geography and network topology.

In some embodiments, the cloud network 140 is a network of resources from a centralized third-party provider using Wide Area Networking (WAN) or Internet-based access technologies. Cloud networking is related the concept of cloud computing, in which the network or computing resources are shared across various customers or clients. The cloud network 140 is distinct, independent, and different from that of the first network 125.

Figure 1B:
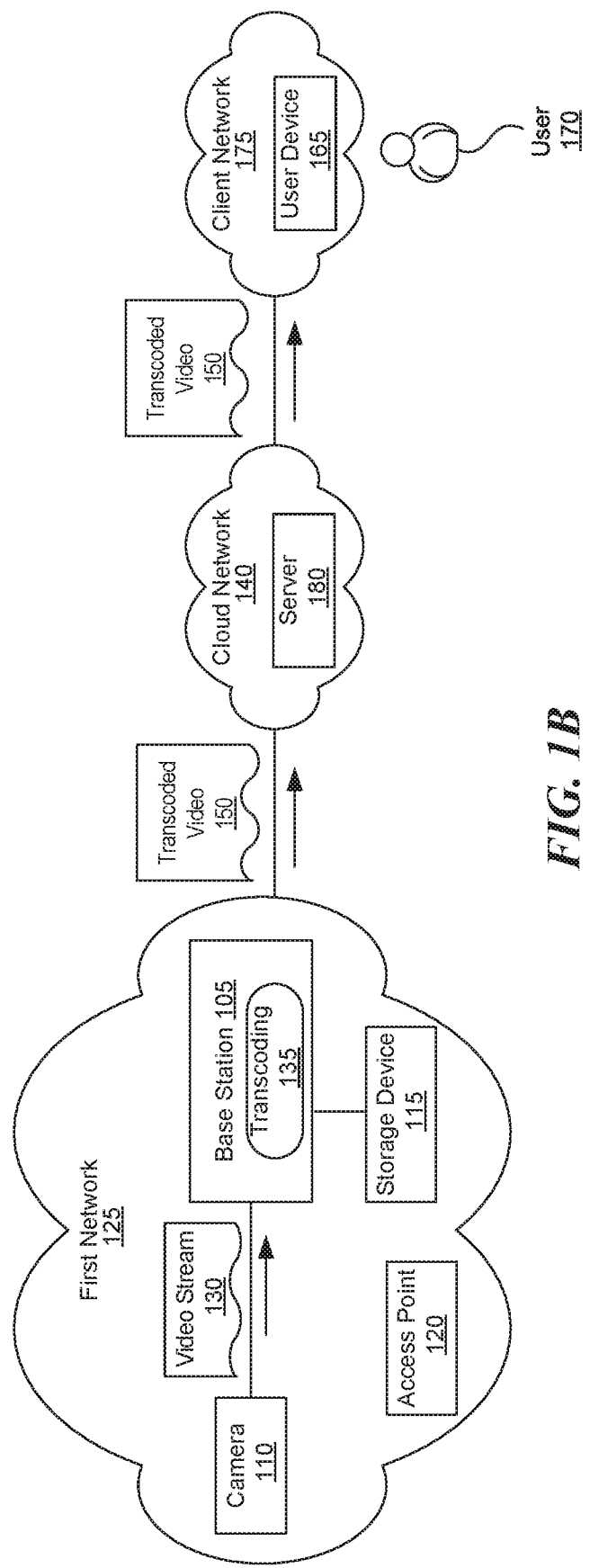
FIG. 1B is a block diagram illustrating streaming of a transcoded video stream via a cloud network, consistent with various embodiments.

In another example of streaming the video to the user device 165, the base station 105 can stream the transcoded video stream 150 to the user device 165 via a video streaming server 180 in the cloud network 140 as illustrated in FIG. 1B, FIG. 1B is a block diagram illustrating streaming of a transcoded video stream via a cloud network, consistent with various embodiments. When the video player on the user device 165 requests the video stream 130, the base station 105 uploads the transcoded video stream 150 to the video streaming server 180 in the cloud network 140, which further streams the transcoded video stream 150 to the user device 165. The user device 165 maintains a continuous connection with the video streaming server 180 to receive the transcoded video stream 150.

The transcoded video stream 150 can be streamed from the base station 105 or from the video streaming server 180. The base station 105 can determine the "streaming from" location, e.g., the base station 105 or the video streaming server 180, based on a streaming location parameter. The streaming location parameter is evaluated based on one or more streaming location factors and is evaluated to one of two values, e.g., Boolean values such as true or false, 0 or 1, "LOCAL" or "REMOTE," etc. If the base station 105 determines that the streaming location parameter is of a first value, e.g., LOCAL, then the streaming is performed from the base station 105. However, if the streaming location parameter is of a second value, e.g., REMOTE, then the base station 105 instructs the video streaming server 180 to perform the streaming. Note that the evaluation function can consider one streaming location factor or a combination of streaming location factors in determining the value. Also, in some embodiments, the user 170 may customize the evaluation function to determine a specific value for specific combination of streaming location factors.

The streaming location parameter is evaluated based on one or more streaming factors, which include user device parameters such as a location of the user device 165; network parameters of the cloud network 140 such as a latency of with the video streaming server 180, a load associated with the video streaming server 180; network parameters associated with the client network 175 such as whether the client network 175 permits P2P streaming, etc. For example, if the base station 105 determines that the user device 165 is in the first network 125, the base station 105 determines the streaming location parameter to be "LOCAL," which indicates that the base station 105 streams the transcoded video stream 150 to the user device 165, e.g., using P2P streaming technique. In another example, if the base station 105 determines that a latency or load associated with the video streaming server 180 is above a specified threshold, the base station 105 determines the streaming location parameter to be "LOCAL". In another example, if the base station 105 determines that the client network 175 to which the user device 165 is connected does not support P2P streaming, the base station 105 determines the streaming location parameter to be "REMOTE," which indicates that the base station 105 has instructed the video streaming server 180 to stream the transcoded video stream 150. In another example, if the user device 165 is experiencing data loss in receiving the transcoded video stream 150 directly from the base station 105, the base station 105 determines the streaming location parameter to be "REMOTE".

In some embodiments, the base station 105 can dynamically determine the "streaming from" location. That is, the base station 105 can continuously monitor the streaming location factors, evaluate the streaming location parameter, and update the "streaming from" location as and when the streaming location parameter changes.

Referring to the transcoding 135, the base station 105 performs the transcoding 135 so that the transcoded video stream 150 is in a form that is suitable for transmission to and consumption by the user device 165. That is, the transcoding 135 converts the video stream 130 from a first form to a second form. Different user devices can have different hardware or software capabilities. For example, the user 170 can have a first user device with a first resolution, e.g., 4K resolution (e.g., 3840 pixels×2160), and a second user device with a second resolution, e.g., 720p (e.g., 1280×720). If the video stream 130 streamed is of 4K resolution, the video stream 130 may not be viewable on the second user device which is of a lower resolution. Similarly, if a data rate of the client network 175 is of a first data rate, e.g., 3 Mbps, and if the video stream 130 streamed to the user device is of 4K resolution at 13 Mbps, the video stream 130 may not be playable or may constantly buffer at the user device 165. Accordingly, the base station 105 determines to perform the transcoding 135 based on one or more input parameters, such as user device parameters, server parameters, network parameters associated with the first network 125, network parameters associated with the cloud network 140, and network parameters associated with the client network 175, to generate the transcoded video stream 150 that is in a form suitable for transmission to and consumption by the user device 165.

Continuing with the above example of user devices having two different resolutions, if the second user device having 720p resolution requests the video stream 130, the transcoding 135 transcodes the video stream 130 to change the resolution of the video from 4K (first form) to 720p (second form) and generates the transcoded video stream 150 having the video at the 720p resolution. If the user 170 requests the video stream 130 from multiple user devices simultaneously, the transcoding 135 can generate multiple transcoded video streams 150, one stream at 4K resolution for a 4K resolution user device and another stream at 720p resolution for 720p resolution device.

As another example of transcoding based on user device parameters, if the video stream 130 from the camera 110 is of MPEG2 format, but the user device 165 supports H.264 and AAC codec, the transcoding 135 can convert the video stream from the MPEG2 format (first form) to R264 video and AAC audio (second form).

As an example of transcoding based on network parameters associated with the first network 125, the transcoding 135 can transcode the video stream 130 based on a data rate, e.g., uplink data rate of the first network 125. In some embodiments, the uplink data rate of the first network 125 is a data rate at which data can be uploaded from a device the first network 125 to another device outside of the first network 125. The transcoding 135 can transcode the video stream 130 to a data rate not higher than the uplink data rate of the first network 125. For example, if the uplink data rate is a maximum of 6 Mbps and if the source video stream 130 is of 4K resolution at 13 Mbps (first form), the transcoding 135 can transcode the video stream 130 to ensure that the transcoded video stream 150 has bit rates not exceeding the uplink data rate by a specified threshold (which is user configurable), e.g., Full-HD resolution at 6 Mbps, or other renditions at 3 Mbps, 1.8 Mbps, 1 Mbps, 600 kbps etc. (second form).

As an example of transcoding based on network parameters associated with the client network 175, the transcoding 135 can transcode the video stream 130 based on a data rate, e.g., downlink data rate of the first network 125. In some embodiments, the downlink data rate of the client network 175 includes a data rate at which data can be downloaded by a device in the client network 175. The transcoding 135 can transcode the video stream 130 to a data rate not higher than the downlink data rate of the client network 175. For example, if the downlink data rate is a maximum of 6 Mbps and if the source video stream 130 is of 4K resolution at 13 Mbps, the transcoding 135 can transcode the video stream 130 to ensure that the transcoded video stream 150 has bit rates not exceeding the downlink data rate by a specified threshold (which is user configurable), e.g., Full-HD resolution at 6 Mbps, or other renditions at 3 Mbps, 1.8 Mbps, 1 Mbps, 600 kbps etc.

As another example of transcoding based on network parameters associated with the client network 175, the transcoding 135 can transcode the video stream 130 based on a type of the client network 175. For example, if the client network 175 is a metered connection such as a cellular data connection, the user 170 may want to minimize the usage of data, and the transcoding 135 can transcode the video stream 130 to a lower resolution to minimize the data consumption. Continuing with the example, if the source video stream 130 is of 4K resolution, the transcoding 135 can transcode the video stream 130 to a lower resolution such as Full-HD or HD.

The base station 105 can also adapt the transcoding 135 dynamically based on the input parameters. That is, the base station 105 continuously monitors the input parameters, and changes the transcoding 135 (if necessary) if there is a change in one or more of the input parameters. For example, if the downlink data rate of the client network 175 changes beyond a specified threshold, e.g., decreases from a first bit rate to a second bit rate, the base station 105 can automatically learn of the decrease in the downlink data rate, and transcode the video stream 130 by decreasing a resolution and/or bit rate of the video stream 130 to generate an adjusted transcoded video stream. Similarly, the base station 105 can have the transcoding 135 increase the resolution and/or the bit rate back up when the downlink rate of the client network 175 improves beyond a specified threshold. In another example, as the availability of memory on an access point of the client network 175 to which the user device 165 is connected decreases, the base station 105 can have the transcoding 135 decrease the bit rate of the video stream 130 from a first bit rate to a second bit rate, since the access point may not be able to buffer enough data packets.

The base station 105 can monitor the input parameters using various means. For example, the base station 105 can obtain network parameters associated with the client network 175 from an access point of the client network 175 through which the user device 165 is connected. The network parameters can include a data rate of the client network 175, a load of the client network 175, a latency of the client network 175, memory availability at the access point. In another example, the base station 105 can obtain network parameters associated with the client network 175 and user device parameters from an app, such as a video player that plays the video stream, installed at the user device 165. The app can identify device parameters such as a type of the user device 165, a resolution of the user device 165, a type of the operating system of the user device 165, and other hardware and software capabilities of the user device 165. The app can also provide information such as a time of arrival of data packets of the transcoded video stream 150 at the user device 165, any loss in data packets, which can be analyzed by the base station 105 to determine or derive various network patterns such as any delay in receipt of the data packets, any congestion in the client network 175, a latency of the client network 175, etc., which can then be used to transcode the video stream 130 accordingly.

Transcoding the video stream 130 at the base station 105 can have various advantages (which are described in the following paragraphs). However, the transcoding 135 is not limited to being performed in the base station 105. The base station 105 can have the transcoding 135 performed in the video streaming server 180 of the cloud network 140, as illustrated in FIG. 2.

Figure 2:
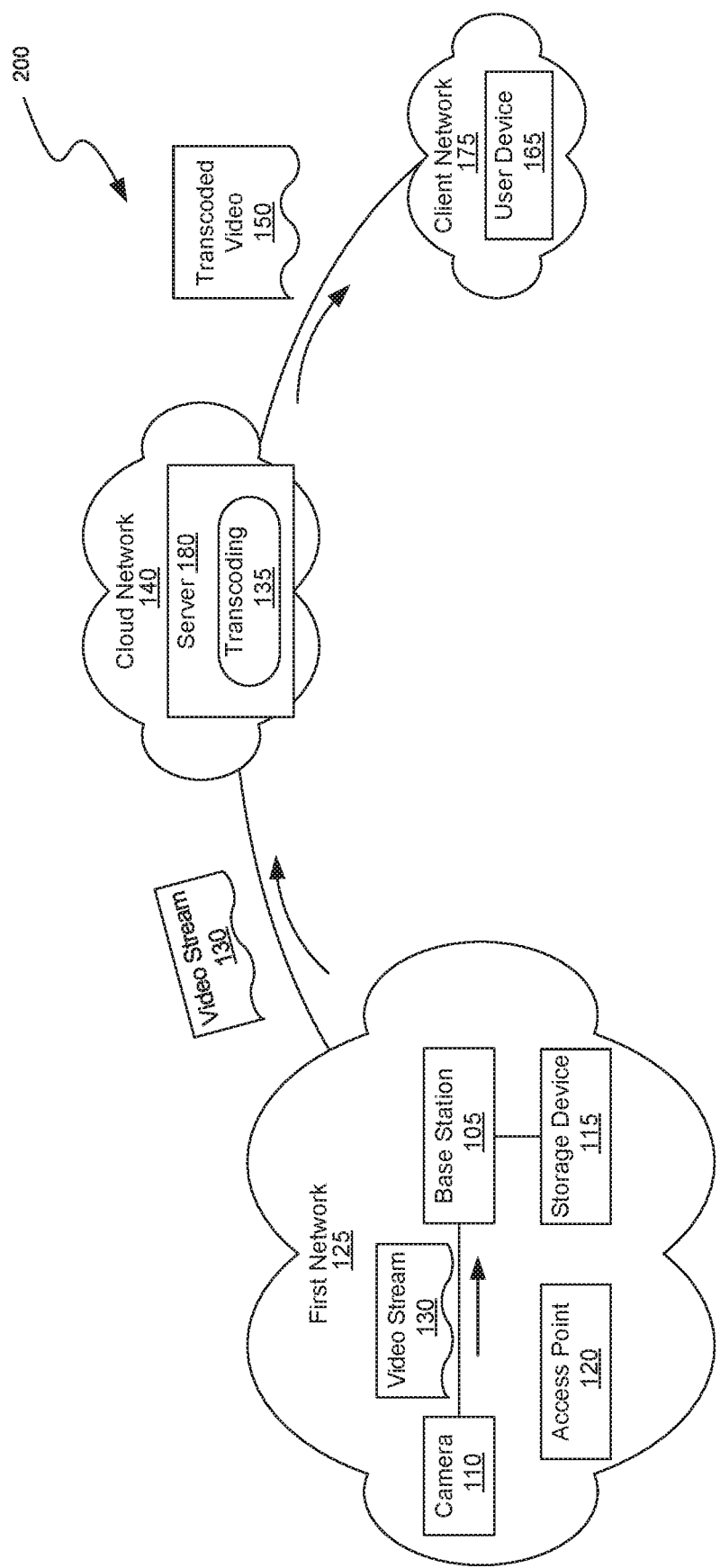
FIG. 2 is a block diagram of an example in the which transcoding of a video stream is performed in a video streaming server in a cloud network, consistent with various embodiments.

FIG. 2 is a block diagram of an example 200 in which transcoding of a video stream is performed in a video streaming server in a cloud network, consistent with various embodiments. In the example 200, when the video player on the user device 165 requests the video stream 130, the base station 105 uploads the video stream 130 to the video streaming server 180 in the cloud network 140, which performs the transcoding 135 of the video stream 130 to generate the transcoded video stream 150 and further streams the transcoded video stream 150 to the user device 165. The user device 165 maintains a continuous connection with the video streaming server 180 to receive the transcoded video stream 150. The input parameters based on which the transcoding 135 is performed is determined by the video streaming server 180, base station 105 or both.

The base station 105 can dynamically determine the "transcode at" location, e.g., base station 105 or the video streaming server 180, based on a transcoding location parameter. The transcoding location parameter is evaluated based on one or more transcoding location factors and is evaluated to one of two values, e.g., Boolean values such as true or false, 0 or 1, "LOCAL" or "REMOTE," etc. If the base station 105 determines that the transcoding location parameter is of a first value, e.g., LOCAL, the transcoding 135 is performed at the base station 105, and if the transcoding location parameter is of a second value, e.g., REMOTE, the base station 105 instructs the video streaming server 180 to perform the transcoding 135. The transcoding location parameter is determined based on one or more transcoding location factors, which include parameters associated with the base station 105 such as hardware or software capabilities of the base station 105; parameters associated with the video streaming server 180 such as a latency, load or a location of the video streaming server 180, a licensing cost associated with the transcoding at the video streaming server 180; user device parameters such as a location of the user device 165; network parameters associated with the client network 175 such as whether the client network 175 supports P2P streaming, etc.

For example, if the base station 105 determines that the base station 105 has a hardware transcoding component, or availability of resources such as processing capacity, memory, is above a specified threshold, then the base station 105 determines the transcoding location parameter as "LOCAL," which indicates that the transcoding 135 is performed at the base station 105. In another example, if the base station 105 determines that a latency or a load associated with the video streaming server 180 is above a specified threshold, if there is a licensing cost associated with the transcoding 135 at the video streaming server 180, or if the licensing cost is above a specified threshold, the base station 105 determines the transcoding location parameter as "LOCAL." In yet another example, if the base station 105 determines that the user device 165 is located in (a) the same network as the base station 105, e.g., the first network 125, or (b) a network in which the latency between the base station 105 and the user device 165 is lesser than a latency between the video streaming server 180 and the user device 165, the base station 105 determines the transcoding location parameter as "LOCAL."

If the base station 105 determines that resources, such as a processing capacity, a memory, are unavailable, or their availability is below a specified threshold for performing the transcoding 135, the base station 105 determines the transcoding location parameter as "REMOTE," which indicates that the base station 105 would instruct the video streaming server to perform the transcoding 135. In another example, if the base station 105 determines that base station 105 does not satisfy a particular transcoding requirement, e.g., a specified codec is unavailable, the base station 105 determines the transcoding location parameter as "REMOTE." In another example, if the base station 105 determines that a latency or a load associated with the video streaming server 180 is below a specified threshold, if there is no licensing cost associated with the transcoding 135 at the video streaming server 180, or if the licensing cost is below a specified threshold, the base station 105 determines the transcoding location parameter as "REMOTE," In yet another example, if the base station 105 determines that the client network 175 does not permit P2P streaming, the base station 105 determines the transcoding location parameter as "REMOTE."

The base station 105 can continuously monitor the transcoding location factors, e.g., by obtaining feedback from the user device 165, from the video streaming server 180, or an access point of the client network 175, determine the transcoding location parameter, and dynamically adapt the transcode at location based on the transcoding location parameter. For example, while the base station 105 is transcoding 135 a first portion of the video stream 130 at the base station 105, it can determine that the transcoding location parameter has changed, and therefore, instruct the video streaming server 180 to transcode the next portion or a remaining portion of the video stream 130.

The video streaming server 180 can be one server which performs both the transcoding 135 of the video stream 130 and streaming of the transcoded video stream 150, or can be more than one server in the cloud network 140—one server transcoding 135 of the video stream 130 and another server streaming the transcoded video stream 150.

Figure 3:
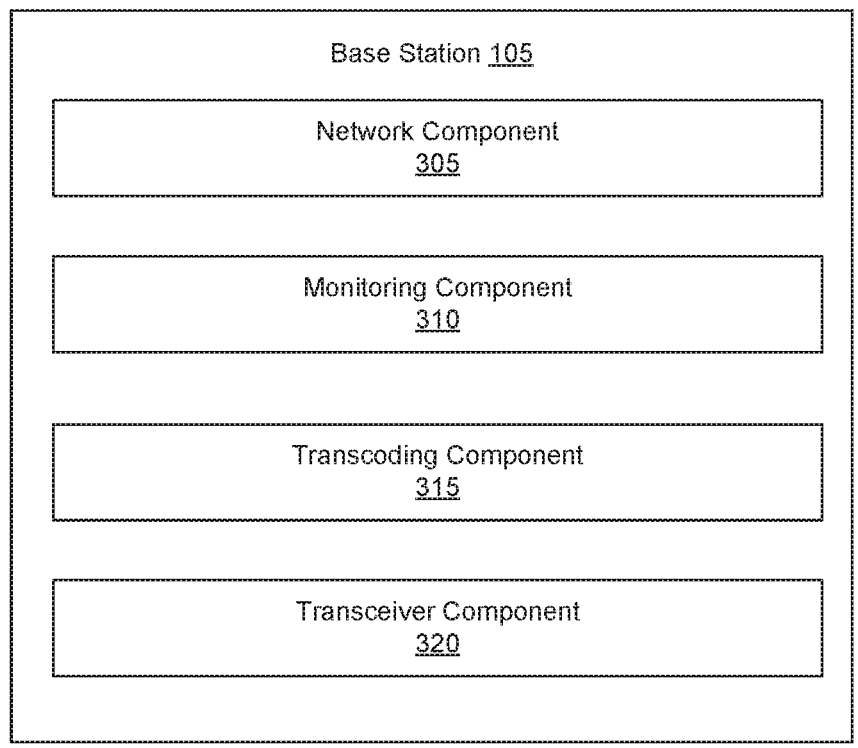
FIG. 3 is a block diagram of the base station of FIG. 1A, consistent with various embodiments.

FIG. 3 is a block diagram of the base station of FIG. 1A, consistent with various embodiments. The base station 105 has multiple components including a network component 305, a monitoring component 310, a transcoding component 315, and a transceiver component 320. The network component 305 establishes the connection with the first network 125, and between the base station 105 and the camera 110.

The monitoring component 310 monitors various parameters, such as input parameters that can be used in determining a form to which the video stream 130 is to be transcoded; streaming location parameter that can be used to determine the streaming from location, transcoding location parameter that can be used to determine the transcode at location.

The transcoding component 315 performs the transcoding 135 of the video stream 130 from a first form to a second form based on one or more of the input parameters.

The transceiver component 320 receives a video stream from the camera 110. The transceiver component 320 can store video streams at and/or retrieve the video streams from various storage sites such as the storage device 115, NAS or a cloud storage service. The transceiver component 320 can receive user requests for live video streams from the camera 110 or recorded video streams stored at the various storage sites and transmit them to the users.

Figure 4:
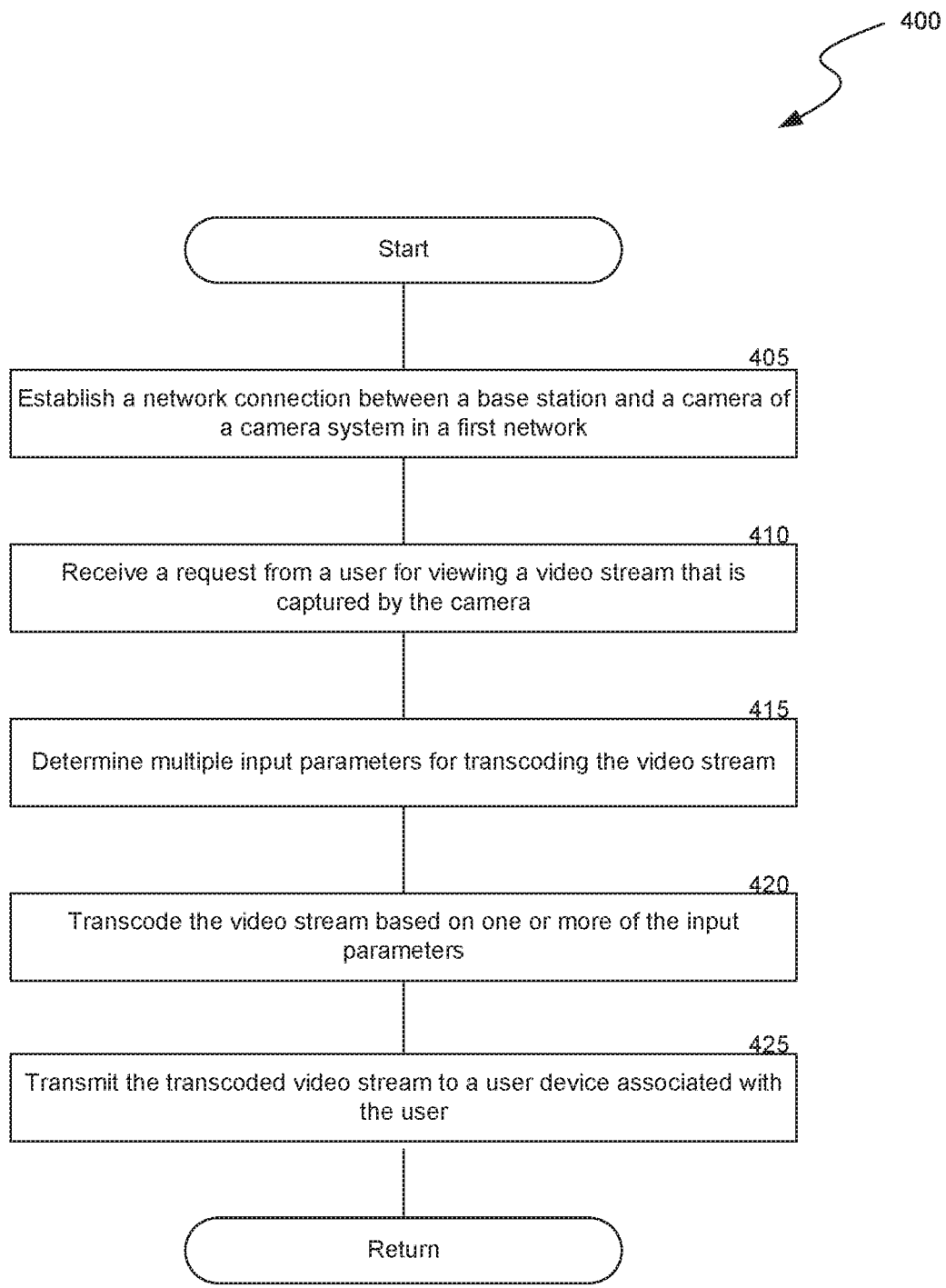
FIG. 4 is a flow diagram of a process for transcoding a video stream in a camera system having a base station, consistent with various embodiments.

Additional details of the foregoing components are described at least with reference to FIGS. 4-6 below. Note that the base station 105 illustrated in FIG. 3 is not restricted to having the above components. The base station 105 can include lesser number of components, e.g., functionalities of two components can be combined into one component, or can include more number of components, e.g., components that perform other functionalities. In some embodiments, the functionalities of one or more of the above components can be split into two or more components. Furthermore, the components of the base station 105 can be implemented at a single computing device or distributed across multiple computing devices, FIG. 4 is a flow diagram of a process 400 for transcoding a video stream in a camera system having a base station, consistent with various embodiments. In some embodiments, the process 400 can be implemented using the base station 105 of FIG. 1A. At block 405, the network component 305 establishes a network connection between the base station 105 and the camera 110 in the first network 125. For example, the network component 305 can connect the base station 105 to the first network 125, either wirelessly or using wired means, discover the camera 110 in the first network 125 and connect to the camera 110, again either wirelessly or using wired means.

At block 410, the transceiver component 320 receives a request from the user 170 for a video stream 130 that is captured using the camera 110. The video stream 130 can be a real-time video stream from the camera 110 or a recording that is stored at one of the various storage sites. The video stream 130 can also include audio data.

At block 415, the monitoring component 310 determines multiple input parameters that may be used in determining to which form the video stream 130 is to be transcoded. The input parameters can include user device parameters, server parameters, network parameters associated with the first network 125, network parameters associated with the cloud network 140, and network parameters associated with the client network 175. The monitoring component 310 can also monitor streaming location parameter that can be used to determine the streaming from location and transcoding location parameter that can be used to determine the transcode at location.

At block 420, the transcoding component 315 transcodes the video stream 130 from a first form to a second form based on one or more of the multiple input parameters. For example, if the video stream is of 4K resolution and the user device 165 requesting the video stream 130 has a display with 720p resolution, the transcoding component 315 transcodes the video stream 130 from 4K to 720p by generating the transcoded video stream 150 at the 720p resolution. It should be noted that the transcoding 135 can either be performed at the base station 105 by the transcoding component 315, or by a video streaming server 180 in the cloud network 140. The base station can make the decision of the transcode at location based on the transcoding location parameter.

At block 425, the transceiver component 320 can transmit the transcoded video stream 150 to the user device 165. The transceiver component 320 can either stream the transcoded video stream 150 to the user device 165 directly, e.g., using P2P streaming, or forward the transcoded video stream 150 to a video streaming server 180 in the cloud network 140 to stream the transcoded video stream 150 to the user device 165. The transceiver component 320 determines the streaming from location based on a value of the streaming location parameter, which is determined by the monitoring component 310 based on one or more streaming location factors.

The transcoded video stream 150 can be streamed using one of many transport protocols, such as HTTP Live Streaming, Dynamic Adaptive Streaming Over HTTP (DASH), Smooth Streaming, HTTP Dynamic Streaming (HDS), MPEG-DASH, WEBRTC or Progressive Download as backup plan. In some embodiments, streaming services such as Wowza can also be used for streaming the transcoded video stream 150.

Figure 5:
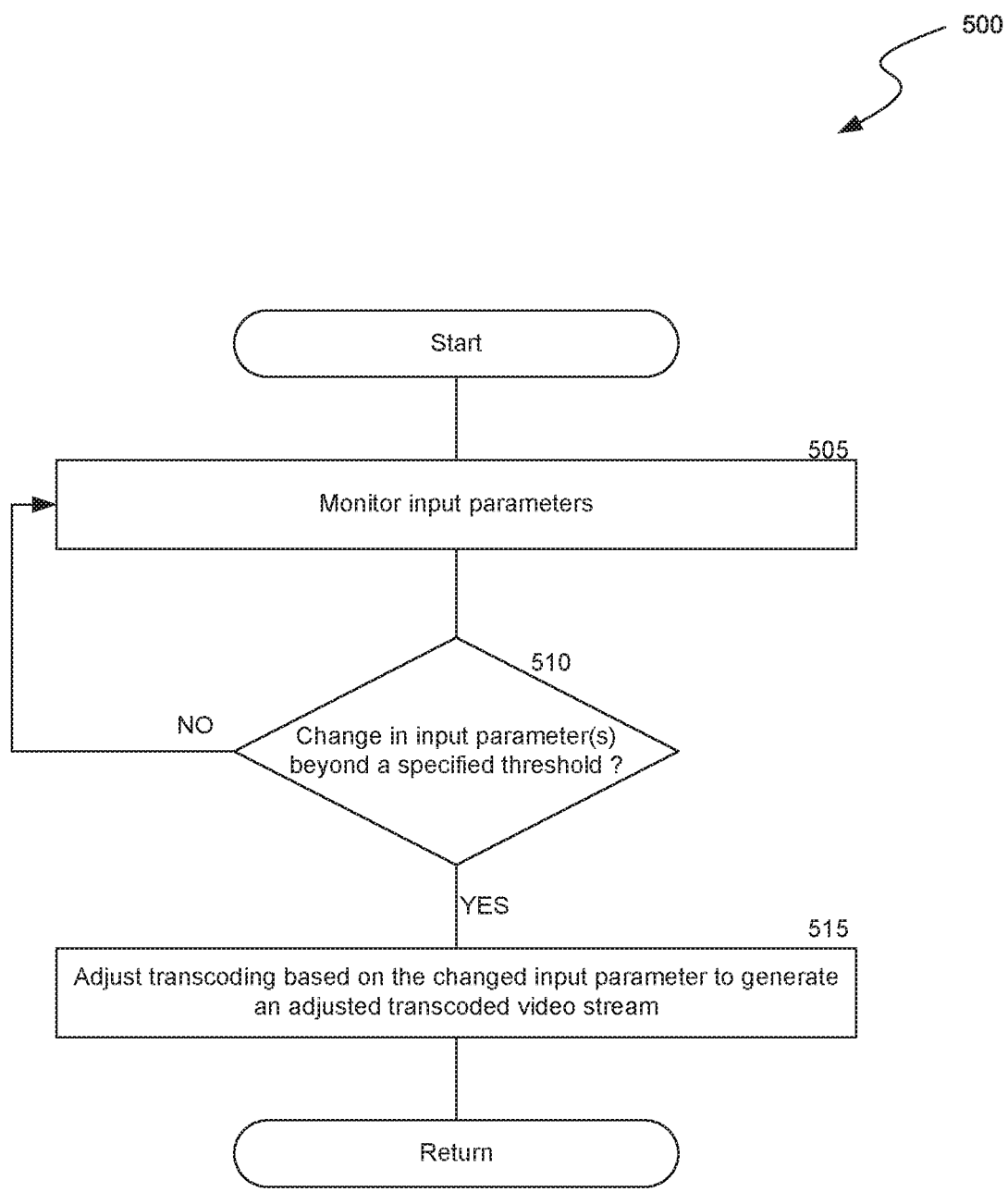
FIG. 5 is a flow diagram of a process for dynamically adapting the transcoding of a video stream, consistent with various embodiments.

FIG. 5 is a flow diagram of a process 500 for dynamically adapting the transcoding of a video stream, consistent with various embodiments. The process 500 may be executed using the base station 105 of FIG. 1A and can be executed as part of block 420 of process 400. At block 505, the monitoring component 310 continues to monitor the input parameters that may be used in determining to which form the video stream 130 is to be transcoded. The input parameters can include user device parameters, server parameters, network parameters associated with the first network 125, network parameters associated with the cloud network 140, and network parameters associated with the client network 175. The monitoring component 310 can obtain the input parameters from, or derive at least some of the input parameters based on the information obtained from, the user device 165, the video streaming server 180, or an access point of the client network 175.

At determination block 510, the monitoring component 310 determines whether any of the input parameters have changed beyond a specified threshold. In some embodiments, a user can define the threshold for a corresponding parameter.

If the monitoring component 310 determines that a specified input parameter has not changed beyond a specified threshold, the process 500 returns to block 505 where the monitoring component 310 continues to monitor the input parameters.

If the monitoring component 310 determines that the specified input parameter has changed beyond a specified threshold, at block 515, the transcoding component 315 adjusts the transcoding of the video stream 130 to generate an adjusted transcoded video stream. For example, consider that a downlink rate of the client network 175 is 15 Mbps and the transcoding component 315 is streaming a transcoded the video stream 130 at 4K resolution at 13 Mbps. If the monitoring component 310 determines that the downlink data rate of the client network 175 has changed beyond a specified threshold, e.g., decreased by more than 50% to 6 Mbps rate, the monitoring component 310 can automatically learn of the decrease in the downlink data rate, and instruct the transcoding component 315 to decrease a resolution and/or bit rate of the video stream 130 to Full HD at 6 Mbps. In response, the transcoding component 315 generates an adjusted transcoded video stream of Full HD resolution at 6 Mbps.

In some embodiments, the base station 105 can also instruct the camera 110 to modify one or parameters associated with the camera 110 based on feedback obtained by the base station 105. For example, the user 170 can provide feedback, e.g., using the app at the user device 165 which the user 170 uses to stream the video, indicating that night-vision images are not clear as the images are dark and the subject is not visible in the image. Upon receiving such feedback, the monitoring component 310 can either instruct the transcoding component 315 to enhance the video stream 130, e.g., by digitally increasing a gain, or instruct the camera 110 to enhance the video stream 130, e.g., by modifying one or more parameters associated with a sensor of the camera 110, such that the images in the video are brighter and the subject is visible. In another example, the user 170 can provide feedback indicating that the colors in the day-vision images are not appropriate or accurate. Upon receiving such feedback, the monitoring component 310 can either instruct the transcoding component 315 to enhance the video stream 130, e.g., by digitally processing the colors, or instruct the camera 110 to enhance the video stream 130, e.g., by changing the color mapping when encoding the video prior to transmission to the base station 105, such that the colors in the video have better accuracy. The base station 105 can not only dynamically adapt the transcoding based on the feedback it can also modify the parameters of the camera 110 to capture images based on user preferences.

Figure 6:
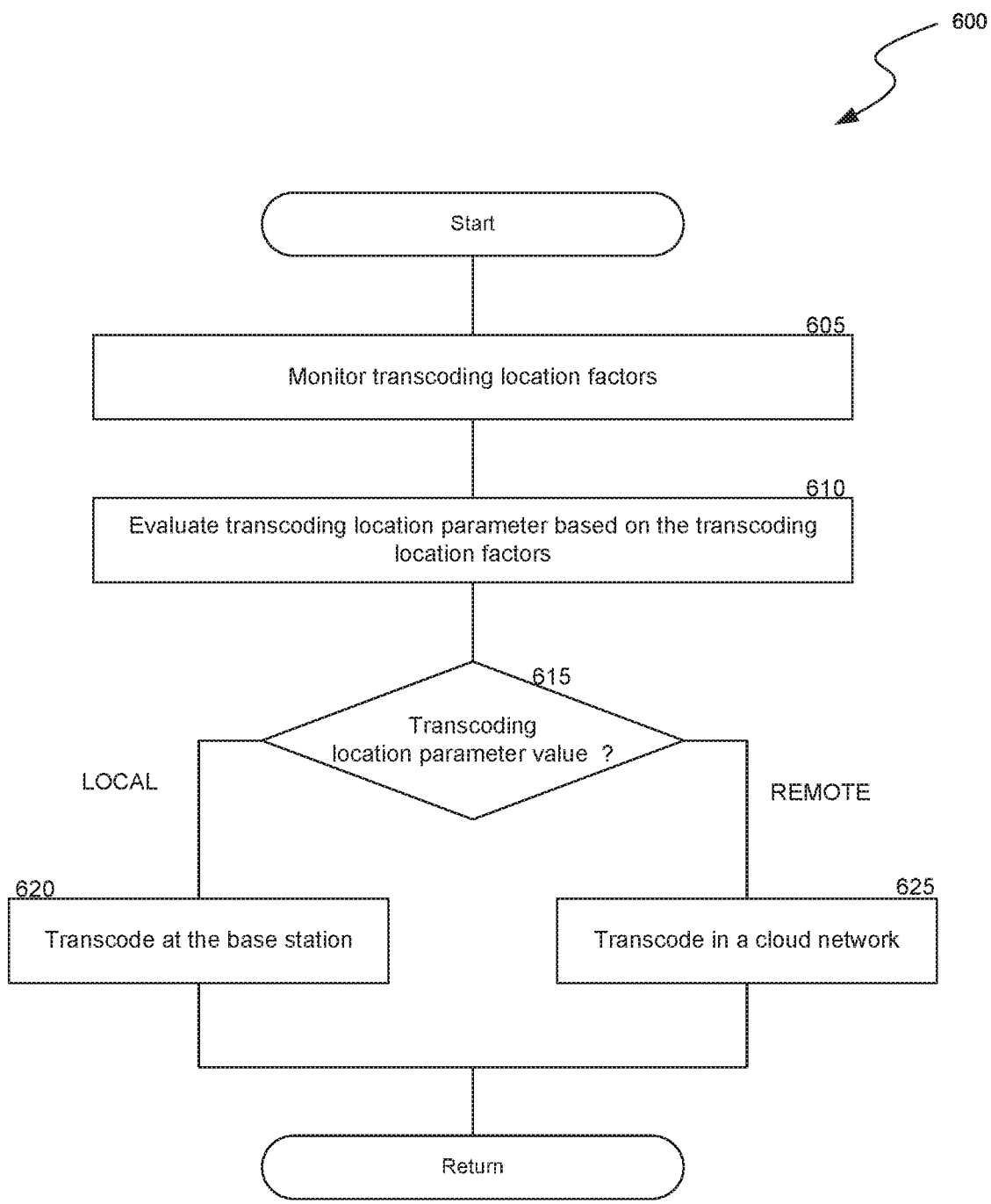
FIG. 6 is a flow diagram of a process for determining a transcoding location of a video stream, consistent with various embodiments.

FIG. 6 is a flow diagram of a process 600 for determining a transcoding location of a video stream; consistent with various embodiments. The process 600 may be executed in the base station 105 of FIG. 1A, and in some embodiments, as part of block 420 of process 400. At block 605, the monitoring component 310 monitors the transcoding location factors, which are described at least with reference to FIG. 2.

At block 610, the monitoring component 310 evaluates a transcoding location parameter based on the transcoding location factors. In some embodiments, the transcoding location parameter is evaluated to one of two values—"LOCAL" and "REMOTE"—in which the value "LOCAL," indicates that the transcoding 135 is performed at the base station 105, and the value "REMOTE" indicates that the transcoding is performed at the video streaming server 180. Note that the evaluation function can consider one factor or a combination of factors in determining the value. Also, in some embodiments, the user 170 may customize the evaluation function to determine a specific value for specific combination of factors.

At determination block 615, the monitoring component 310 determines whether the value of the transcoding location parameter is "LOCAL," or "REMOTE." For example, if the base station 105 determines that the base station 105 has a hardware transcoding module; availability of resources such as processing capacity, memory, is above a specified threshold; a latency or a load associated with the video streaming server 180 is above a specified threshold; if there is a licensing cost associated with the transcoding 135 at the video streaming server 180; if the licensing cost is above a specified threshold, the monitoring component 310 determines the transcoding location parameter as "LOCAL." If the monitoring component 310 determines that resources at the base station 105, such as a processing capacity, a memory, are unavailable, or their availability is below a specified threshold for performing the transcoding 135; that the base station 105 does not satisfy a particular transcoding requirement, e.g., a specified codec is unavailable, the base station 105 determines the transcoding location parameter as "REMOTE."

If the monitoring component 310 determines that a value of the transcoding location parameter is "LOCAL," at block 620, the monitoring component 310 instructs the transcoding component 315 to perform the transcoding 135.

On the other hand, if the monitoring component 310 determines that a value of the transcoding location parameter is "REMOTE," at block 625, the monitoring component 310 instructs the transceiver component 320 to transmit the video stream 130 to a video streaming server 180 in the cloud network 140 for performing the transcoding 135.

Figure 7:
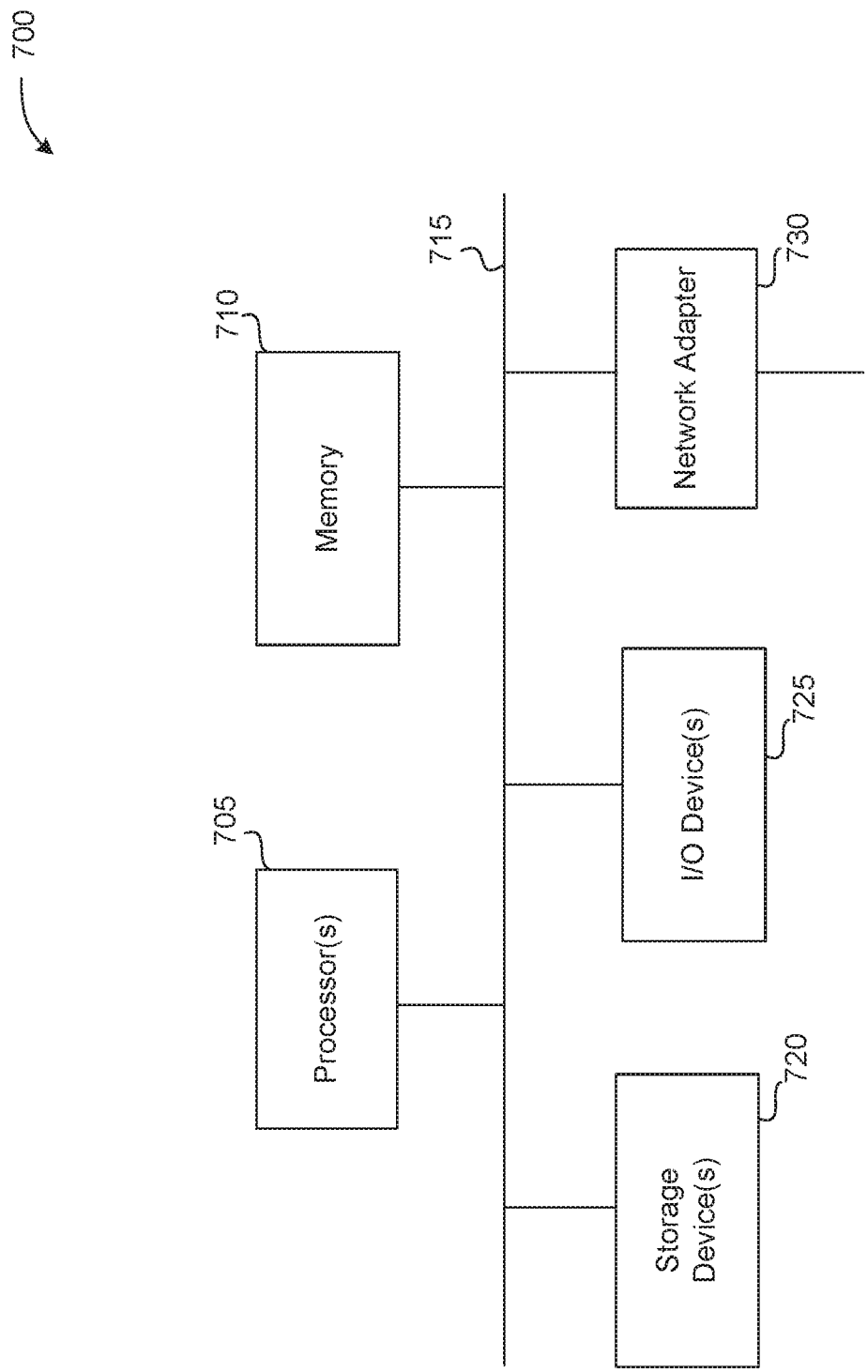
FIG. 7 is a block diagram of a computer system as may be used to implement features of some embodiments of the disclosed technology.

FIG. 7 is a block diagram of a computer system as may be used to implement features of some embodiments of the disclosed technology. The computing system 700 may be used to implement any of the entities, components or services depicted in the foregoing figures (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. A method comprising:
    establishing a network connection between a base station and a video camera in a first network;
    receiving, at the base station and from a user device associated with a user, a request for viewing a video stream that is captured by the video camera;
    determining, at the base station, multiple input parameters for transcoding the video stream, wherein at least some of the input parameters are associated with the user device;
    transcoding, at the base station, the video stream based on one or more of the multiple input parameters to generate a transcoded video stream; and
    transmitting the transcoded video stream from the base station to the user device;
    wherein the input parameters for transcoding the video stream include a first set of network parameters associated with the first network, said first set of parameters comprising uplink data rate, a second set of parameters associated with the user device, said second set of parameters comprising any of a resolution of the user device, a type of network connection at the user device, hardware and/or software capabilities of the user device, or a battery state of the user device, and a third set of parameters associated with a video streaming server that transmits the transcoded video stream to the user device, said third set of set of parameters comprising any of a network speed, a load, a data rate, or an outage of a network associated with the user device, an amount of memory available at video streaming server, processing capacity of the video streaming server, or a latency of the video streaming server.

2. The method of claim 1, wherein establishing the network connection includes receiving the video stream from the video camera at the base station.

3. The method of claim 1, wherein transcoding the video stream includes:
    receiving, at the base station, the video stream from the video camera as a real-time video stream, and
    transcoding the real-time video stream to generate the transcoded video stream.

4. The method of claim 1, wherein transcoding the video stream includes:
    retrieving, at the base station, the video stream from a storage device associated with the base station, wherein the video stream received from the video camera is stored at the storage device, and
    transcoding the video stream from the storage device to generate the transcoded video stream.

5. The method of claim 1, wherein transmitting the transcoded video stream includes transmitting the transcoded video stream from the base station to a video streaming server in a second network for transmission to the user device.

6. The method of claim 1, wherein transmitting the transcoded video stream includes transmitting the transcoded video stream from the base station to the user device using a peer-to-peer (P2P) streaming technique.

7. The method of claim 6, wherein transmitting the transcoded video stream using the P2P streaming technique includes exchanging signaling information between the base station and the user device via a server in a second network for P2P transmission of the transcoded video stream.

8. The method of claim 1, wherein transmitting the transcoded video stream includes determining, at the base station, whether to transmit the transcoded video stream to the user device using a P2P streaming technique or via a video streaming server based on parameters associated with at least one of the video streaming server or a third network in which the user device is located.

9. The method of claim 8 further comprising:
responsive to a determination that a network latency associated with the third network is above a specified threshold, transmitting the transcoded video stream to the video streaming server for transmission to the user device.

10. The method of claim 8 further comprising:
responsive to a determination that a network latency associated with the third network is below a specified threshold, transmitting the transcoded video stream to the user device using the P2P streaming technique.

11. The method of claim 8 further comprising:
responsive to a determination that a load associated with the video streaming server is above a specified threshold, transmitting the transcoded video stream to the user device using the P2P streaming technique.

12. The method of claim 1, wherein the first set of network parameters includes an uplink data rate of the base station in the first network to send the transcoded video stream.

13. The method of claim 12 further comprising:
determining that the uplink data rate decreased from a first value to a second value, and
transcoding the video stream to decrease a bit rate of the video stream, wherein the bit rate in the transcoded video stream is decreased from a third value to a fourth value.

14. The method of claim 1, wherein transcoding the video stream includes:
determining that the data rate of the second network increased from a first value to a second value, and
adjusting the transcoding to increase a resolution of the video stream from a second value to a third value to generate an adjusted transcoded video stream.

15. The method of claim 1, wherein determining the input parameters includes:
determining at least some parameters from the second set of parameters using an app installed on the user device.

16. The method of claim 1, wherein determining the input parameters includes:
determining at least some parameters from the second set of parameters using an access point associated with the user device.

17. The method of claim 1, wherein transcoding the video stream includes:
determining that one of the input parameters changed, and
adjusting the transcoding to generate an adjusted transcoded video stream.

18. A computer-readable storage medium storing computer-readable instructions, comprising:
instructions for receiving, at a base station in a first network and from a user device associated with a user, a request for viewing a video stream that is captured by a video camera associated with the base station;
instructions for determining whether a transcoding location parameter is of a first value or a second value;
instructions for determining to transcode the video stream at the base station if the transcoding location parameter is of the first value;
instructions for determining to transcode the video stream at a video streaming server in a second network if the transcoding location parameter is of the second value;
instructions for transcoding the video stream based on multiple input parameters to generate a transcoded video stream; and
instructions for transmitting the transcoded video stream to the user device;
wherein the input parameters for transcoding the video stream include a first set of network parameters associated with the first network, said first set of parameters comprising uplink data rate, a second set of parameters associated with the user device, said second set of parameters comprising any of a resolution of the user device, a type of network connection at the user device, hardware and/or software capabilities of the user device, or a battery state of the user device, and a third set of parameters associated with a video streaming server that transmits the transcoded video stream to the user device, said third set of set of parameters comprising any of a network speed, a load, a data rate, or an outage of a network associated with the user device, an amount of memory available at video streaming server, processing capacity of the video streaming server, or a latency of the video streaming server.

19. The computer-readable storage medium of claim 18, wherein the instructions for determining whether the transcoding location parameter is of the first value or the second value include:
instructions for determining that the transcoding location parameter is of the first value in an event the base station has a hardware transcoding component, a latency or load of the video streaming server is above a specified threshold, or the user device is in the first network.

20. The computer-readable storage medium of claim 18, wherein the instructions for determining whether the transcoding location parameter is of the first value or the second value include:
instructions for determining that the transcoding location parameter is of the second value in an event the user device is incapable of receiving the video stream using a P2P streaming technique.

21. The computer-readable storage medium of claim 18, wherein the instructions for transcoding the video stream include:
instructions for determining that a first resolution of the user device is lesser than a second resolution at which the video stream is encoded by the video camera, wherein the first resolution is one of the input parameters, and
instructions for transcoding the video stream to the first resolution.

22. The computer-readable storage medium of claim 18, wherein the instructions for transcoding the video stream include:
instructions for determining that a data rate associated with a third network in which the user device is located increased from a first data rate to a second data rate, wherein the data rate is one of the input parameters, and
instructions for increasing a quality of the video stream by transcoding the video stream from a first bit rate to a second bit higher than the first bit rate.

23. The computer-readable storage medium of claim 18, wherein the instructions for transcoding the video stream include:
  instructions for receiving a feedback from the user device, the feedback indicating that the user device is experiencing a data loss in receiving the video stream, and
  instructions for transcoding the video stream from a first bit rate to a second bit lower than the first bit rate.

24. The computer-readable storage medium of claim 18, wherein the instructions for transcoding the video stream include:
  instructions for receiving a feedback from the user device, the feedback indicating that the user device has a video decoder of a specified protocol, and
  instructions for transcoding the video stream to encode the video stream to the specified protocol.

25. A base station, comprising:
  a processor;
  a network component that is configured to establish a connection with a first network and to a video camera in the first network;
  a monitoring component that is configured to monitor multiple input parameters for transcoding a video stream;
  a transcoding component that is configured to transcode the video stream based on one or more of the multiple input parameters to generate a transcoded video stream; and
  a transceiver component that is configured to:
    receive the video stream from the video camera, and
    transmit the transcoded video stream to a user device;
  wherein the input parameters for transcoding the video stream include a first set of network parameters associated with the first network, said first set of parameters comprising uplink data rate, a second set of parameters associated with the user device, said second set of parameters comprising any of a resolution of the user device, a type of network connection at the user device, hardware and/or software capabilities of the user device, or a battery state of the user device, and a third set of parameters associated with a video streaming server that transmits the transcoded video stream to the user device, said third set of set of parameters comprising any of a network speed, a load, a data rate, or an outage of a network associated with the user device, an amount of memory available at video streaming server, processing capacity of the video streaming server, or a latency of the video streaming server.

26. The base station of claim 25, wherein the input parameters include network parameters associated with the first network, and wherein the monitoring component is configured to obtain the network parameters from an access point of the first network.

27. The base station of claim 25, wherein the input parameters include network parameters associated with a second network to which the user device is connected.

28. The base station of claim 27, wherein the monitoring component is configured to obtain the network parameters from an access point of the second network.

29. The base station of claim 27, wherein the monitoring component is configured to obtain the network parameters from an app executing at the user device.

30. The base station of claim 27, wherein the monitoring component is configured to determine that a type of network connection of the user device changed from a first type to a second type, and wherein the transcoding component is configured to transcode the video stream to lower a quality of the video stream by transcoding the video stream from a first bit rate to a second bit lower than the first bit rate.

31. The base station of claim 25, wherein the monitoring component is configured to receive feedback from the user device indicating that a visibility of subjects in the video stream in a night vision mode of the video camera is below a specified threshold, and wherein the transceiver component is configured to send instructions to the video camera to modify one or more image capturing parameters associated with the video camera to improve the visibility.

32. The base station of claim 25, wherein the transceiver component is configured to:
  stream the transcoded video stream to the user device using a P2P streaming technique, or
  transmit the transcoded video stream to a video streaming server in a second network for streaming to the user device.

33. The base station of claim 25, wherein the transceiver component is configured to:
  determine that the user device is in the first network, and
  stream the transcoded video stream from the base station to the user device directly, or via an access point of the first network.

* * * * *